United States Patent
Hertzberg et al.

(10) Patent No.: US 8,279,877 B2
(45) Date of Patent: Oct. 2, 2012

(54) METHOD FOR PROCESSING ATM CELLS AND A DEVICE HAVING ATM CELL PROCESSING CAPABILITIES

(75) Inventors: Aviram Hertzberg, Kohav Yair (IL); Haim Ben-Lulu, Rehovat (IL); Graham Edmiston, Glasgow (GB)

(73) Assignee: Freescale Semiconductor, Inc., Austin, TX (US)

(*) Notice: Subject to any disclaimer, the term of this patent is extended or adjusted under 35 U.S.C. 154(b) by 319 days.

(21) Appl. No.: 12/094,573

(22) PCT Filed: Nov. 22, 2005

(86) PCT No.: PCT/EP2005/056134
§ 371 (c)(1),
(2), (4) Date: May 21, 2008

(87) PCT Pub. No.: WO2007/059800
PCT Pub. Date: May 31, 2007

(65) Prior Publication Data
US 2009/0046725 A1    Feb. 19, 2009

(51) Int. Cl.
*H04L 12/28* (2006.01)
*H04L 12/56* (2006.01)
(52) U.S. Cl. ............. 370/397; 370/395.31; 370/395.32
(58) Field of Classification Search .......... 370/396, 370/353, 398, 389, 392, 395
See application file for complete search history.

(56) References Cited

U.S. PATENT DOCUMENTS

| | | | |
|---|---|---|---|
| 5,414,701 A | 5/1995 | Shtayer et al. | |
| 5,481,687 A * | 1/1996 | Goubert et al. | 711/212 |
| 5,905,729 A * | 5/1999 | Gaddis et al. | 370/399 |
| 6,034,958 A * | 3/2000 | Wicklund | 370/395.32 |
| 6,259,699 B1 * | 7/2001 | Opalka et al. | 370/398 |
| 6,356,553 B1 * | 3/2002 | Nagami et al. | 370/397 |
| 6,421,715 B1 * | 7/2002 | Chatterjee et al. | 709/219 |
| 6,452,939 B1 * | 9/2002 | Yang et al. | 370/465 |
| 6,535,526 B1 | 3/2003 | Oyamada et al. | |
| 6,553,453 B1 * | 4/2003 | Gibson et al. | 711/108 |
| 6,735,191 B1 | 5/2004 | Hosein | |
| 6,760,345 B1 | 7/2004 | Rosengard | |
| 6,819,653 B1 | 11/2004 | Hodgins et al. | |
| 2002/0181463 A1 * | 12/2002 | Knight | 370/392 |
| 2003/0043806 A1 | 3/2003 | Davis et al. | |
| 2003/0053467 A1 * | 3/2003 | Miyamoto | 370/401 |
| 2003/0081610 A1 | 5/2003 | Bharucha et al. | |
| 2004/0001451 A1 | 1/2004 | Bernheim et al. | |
| 2004/0131062 A1 | 7/2004 | Horie | |
| 2004/0246966 A1 | 12/2004 | Wu et al. | |

* cited by examiner

*Primary Examiner* — John Blanton
*Assistant Examiner* — Cassandra Decker (57) ABSTRACT

A method and a communication device for processing ATM cells. The communication device includes an input interface adapted to receive an ATM cell that is associated with a PHY value and includes a pair of VCI and VPI fields. The communication device is characterized by comprising a search unit, adapted to search, within a group of memory entries that belong to a memory unit, for a pair of VCI and VPI fields that have values that match the values of the VCI and VPI fields of the received ATM cell, if the received VCI field and VPI fields belong to a first predefined group of VCI and VPI fields. The communication device further includes a processor, connected to the search unit, wherein the processor is adapted to determine a channel identifier of the received ATM cell in response to a result of the search and in response to a PHY value associated with the received ATM cell.

22 Claims, 8 Drawing Sheets

METHOD FOR PROCESSING ATM CELLS AND A DEVICE HAVING ATM CELL PROCESSING CAPABILITIES

FIELD OF THE INVENTION

The invention relates to a device having ATM cell processing capabilities and to a method for processing ATM cells.

BACKGROUND OF THE INVENTION

In today's communications, digital networks transport large amounts of information. Network services can be, for example, traditional voice phone, facsimile, television, audio and video broadcast, and data transfer.

With the increasing need of information exchange in the global society, the capacity of existing and future networks must be used efficiently. Multiplexers switch different network services to a single network in such a way that every service is fully maintained and does not disturb other services.

Asynchronous Transfer Mode (ATM) is one of the most commonly used communication protocols. ATM is a connection-oriented protocol. ATM protocol assigns virtual channels to each ATM cell. The virtual channel is supported by a physical link. ATM protocol compliant devices process information by framing the information to ATM cells. An ATM cell includes a payload as well as a header. The header includes various fields that map the ATM cell to the virtual channel. These fields include the virtual channel identifier (VCI) field and the virtual path identifier (VPI) field.

The ATM cell is associated with a physical layer (PHY) value that represents the physical link on which the ATM cell arrives or originated from. A device, such as a media access unit, an UTOPIA bus manager as well as an ATM switch associate the PHY value with the ATM cell.

The VCI field is twelve bits long, the VCI field is sixteen bits long and the PHY value is five bits long. It is noted that the PHY value can be longer. Thus, there are at least $2^{33}$ possible combinations of these fields. When an ATM switch or router receives an ATM cell it has to determine what is the channel associated with that ATM cell. Theoretically there are $2^{33}$ possible channels, while in practice the number of connections supported by a single ATM switch is much lower.

Various methods were adopted for mapping the very large number of possible channels with a smaller number of channels. One commonly used technique involves hashing. A hashing function maps the $2^{33}$ space to a much smaller space. The following U.S. patents and patent applications, all being incorporated herein by reference, illustrate some hashing techniques: U.S. Pat. No. 6,034,958 of Wicklund, U.S. patent application publication serial number 2004/0246966A1 of Wu et al., U.S. patent application serial number 2004/0131062A1 of Horie, U.S. Pat. No. 6,760,345 of Rosengard, U.S. Pat. No. 6,735,191 of Hosein, U.S. patent application serial number 2004/0001451 of Bernheim et al., U.S. patent application serial number 2003/0043806A1 of Davis et al., U.S. patent application serial number 2003/0081610A1 of Bharucha et al., and U.S. Pat. No. 6,535,526 of Oyamada et al.

Typical hashing functions require a relatively large number of memory accesses and data processing stages.

There is a need to provide efficient methods and devices for processing ATM cells.

SUMMARY OF THE PRESENT INVENTION

A device having ATM cell processing capabilities and for a method for processing ATM cells, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

A method for processing ATM cells and a communication device. The method and the communication device simplify the processing of ATM cells, especially when the communication device is used to process ATM cells that are exchanged with users that have a small number of devices. Conveniently, when servicing multiple users that are differentiated mainly by their PHY field values, one or more small groups of memory entries (also referred to as VCI/VPI tables) can be allocated for searching for matching VCI and VPI field values.

Conveniently, different users are associated with VCI/VPI fields values that are selected from a relatively small group of allowable VCI/VPI fields values. The group is much smaller that the number of possible VCI/VPI combinations, and especially can be smaller than one thousand or even one hundred.

According to an embodiment of the invention a communication device is provided. The communication device includes an input interface that is adapted to receive an ATM cell. The ATM cell includes a pair of VCI and VPI fields. The communication device further includes a search unit that is adapted to search, within a group of memory entries that belong to a memory unit, for a pair of VCI and VPI fields that match the VCI and VPI fields of the received ATM cell. Conveniently the search is conducted if the values of the received VCI and VPI fields belong to a first predefined group of allowed VCI field and VPI field values. The communication device also includes a processor that is connected to the search unit, whereas the processor is adapted to determine a channel identifier of the received ATM cell in response to a result of the search and in response to a PHY value associated with the received ATM cell. The device can associated that PHY value to the ATM cell but this is not necessarily so.

According to an embodiment of the invention a method is provided. The method includes: (i) receiving an ATM cell that includes a pair of VCI and VPI fields, (ii) searching, within a group of memory entries, for a pair of VCI and VPI fields that match the VCI and VPI fields of the received ATM cell, if a values of the received pair of VCI and VPI fields belong to a first predefined group of allowed VCI and VPI fields values; and determining a channel identifier of the received ATM cell in response to a result of the searching and in response to a PHY value associated with the received ATM cell.

Figure 1:
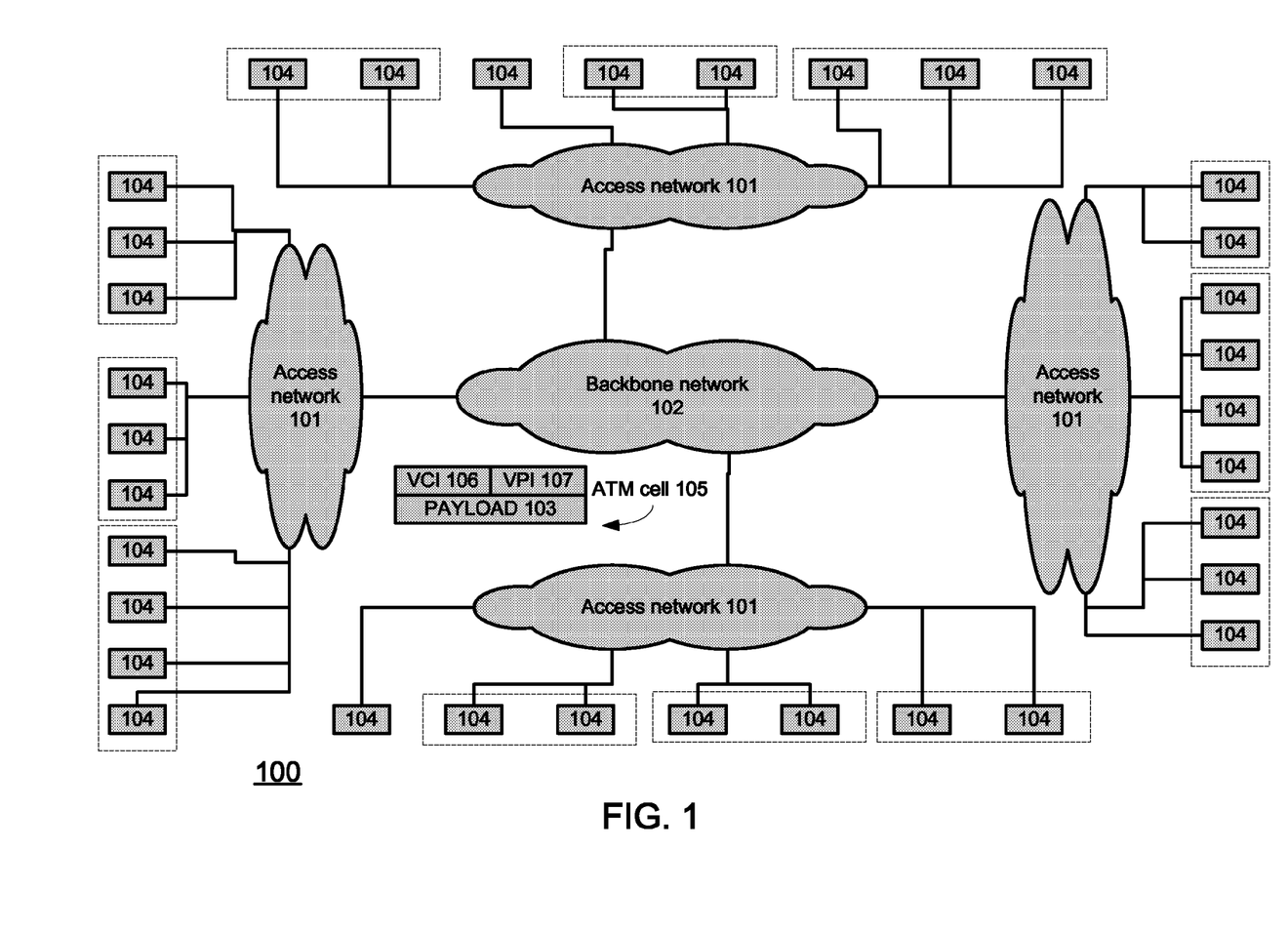
FIG. 1 illustrates a communication network, according to an embodiment of the invention.

FIG. 1 illustrates a communication network 100 according to an embodiment of the invention.

Communication network 100 is connected to many user devices (denoted 104). The communication network 100 can include one or more access networks 101 as well as backbone network 102. The access networks 101, backbone network 102, as well as the interface between the access networks 101 and backbone network 102 can include one or more switches or routers. Conveniently, theses switches or routers include communication devices such as communication device 10 of FIG. 2. A communication device 10 can include one or more integrated circuits such as the PowerQuicc™ communication integrated circuits of Freescale™ Inc.

Communication network 100 can service a large variety of users as well as a large number of users. Many users can be domestic users or otherwise users that are characterized by having a relatively small number of devices (denoted 104). A dashed box surrounds the devices that belong to a single user. Each user can be associated with a unique PHY value. Various switches and routers within the various networks can assign different PHY values to the same user, as long as they are able to differentiate between traffic that originates from different users. A small number of combinations of VCI field and VPI fields are allocated per user. Conveniently, a small amount of VCI/VPI values is allocated for a large number of users.

An exemplary ATM cell 105 is also illustrated. It has payload 103, a VCI field 106, VPI field 107. ATM cell 103 is associated with a PHY value that is not shown in FIG. 1.

The values of these fields can be changed by each switch or router. It is assumed that the values of the pair of VCI and VPI fields 106 and 107 belong to a first predefined group of allowed VCI and VPI field pair values. It is noted that a value of a pair of VCI and VPI field is the combination of the value of the VCI field and the value of the VPI field. Conveniently, ATM cell 105 belongs to a group of ATM cells that can be efficiently processed by using a VCI/VPI table 500 of FIG. 6.

Figure 2:
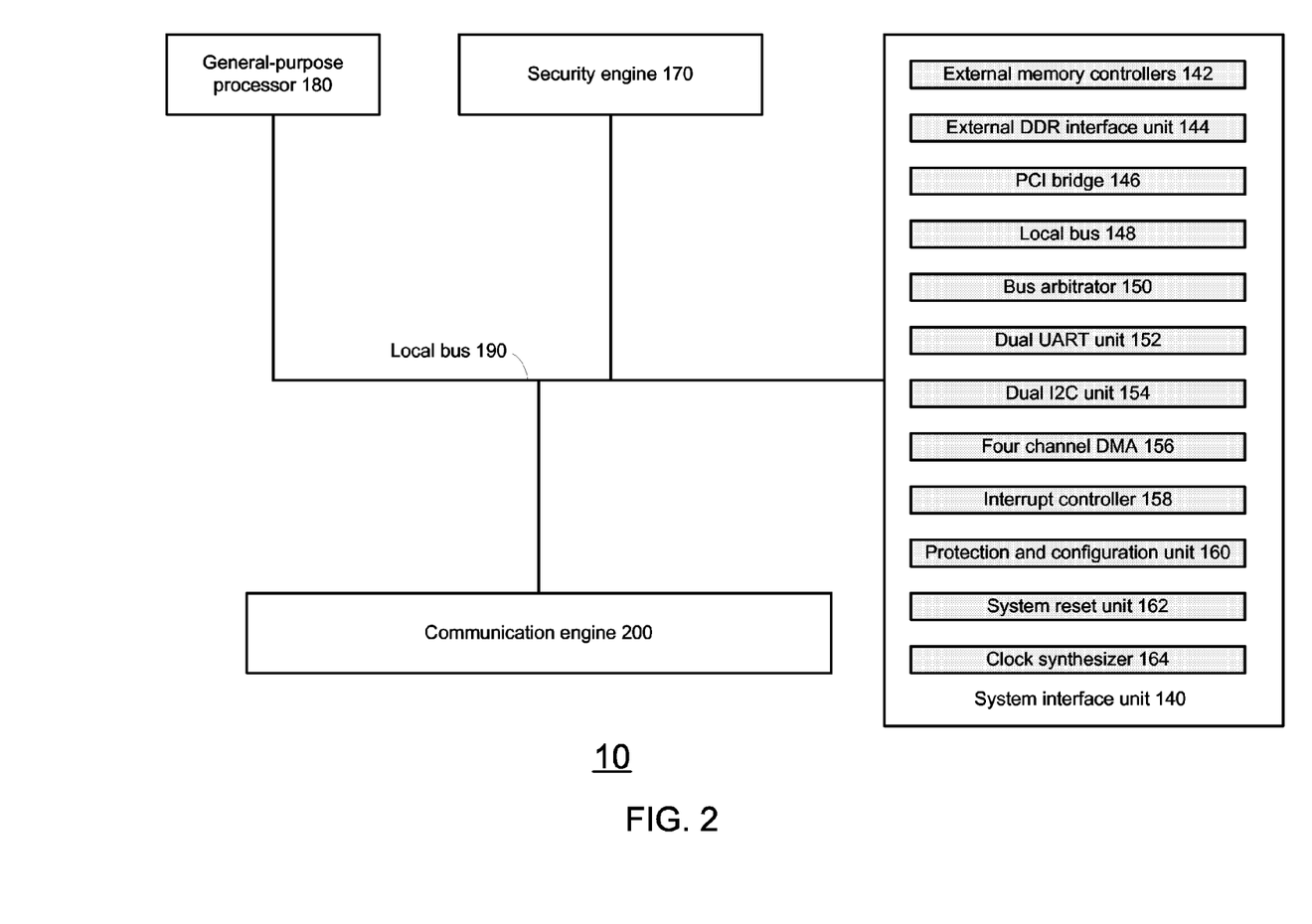
FIG. 2 illustrates a communication device, according to an embodiment of the invention.

FIG. 2 illustrates a communication device 10, according to an embodiment of the invention.

Communication device 10 includes a first processor, such as general-purpose processor 180, a security engine 170, system interface unit 140, communication engine 200 and multiple ports (not shown). Components 180, 170, 140 and 200 are connected to each other by central bus 190.

The general-purpose processor 180 can include multiple execution units such as but not limited to an integer unit, a branch processing unit, a floating point unit, a load/store unit and a system register unit. It can also include various cache memories, dynamic power management unit, translation look aside buffers, and the like.

The general-purpose processor 180 controls the communication device 10 and can execute various programs according to the required functionality of communication device 10. The general-purpose processor 180 can be a member of the PowerPC™ family but this is not necessarily so.

The security engine 170 can apply various security mechanisms including encryption based mechanisms and the like.

Communication device 10 can be connected to multiple memory units as well as other components. These components are interfaced by system interface unit 140. System interface unit 140 may include some of the following components: external memory controllers 142, external DDR interface unit 144, PCI bridge 146, local bus 148, bus arbitrator 150, Dual UART unit 152, dual I$^2$C unit 154, a four channel DMA 156, interrupt controller 158, protection and configuration unit 160, system reset unit 162 and clock synthesizer 164. It is noted that other interfacing components can be used.

Figure 3:
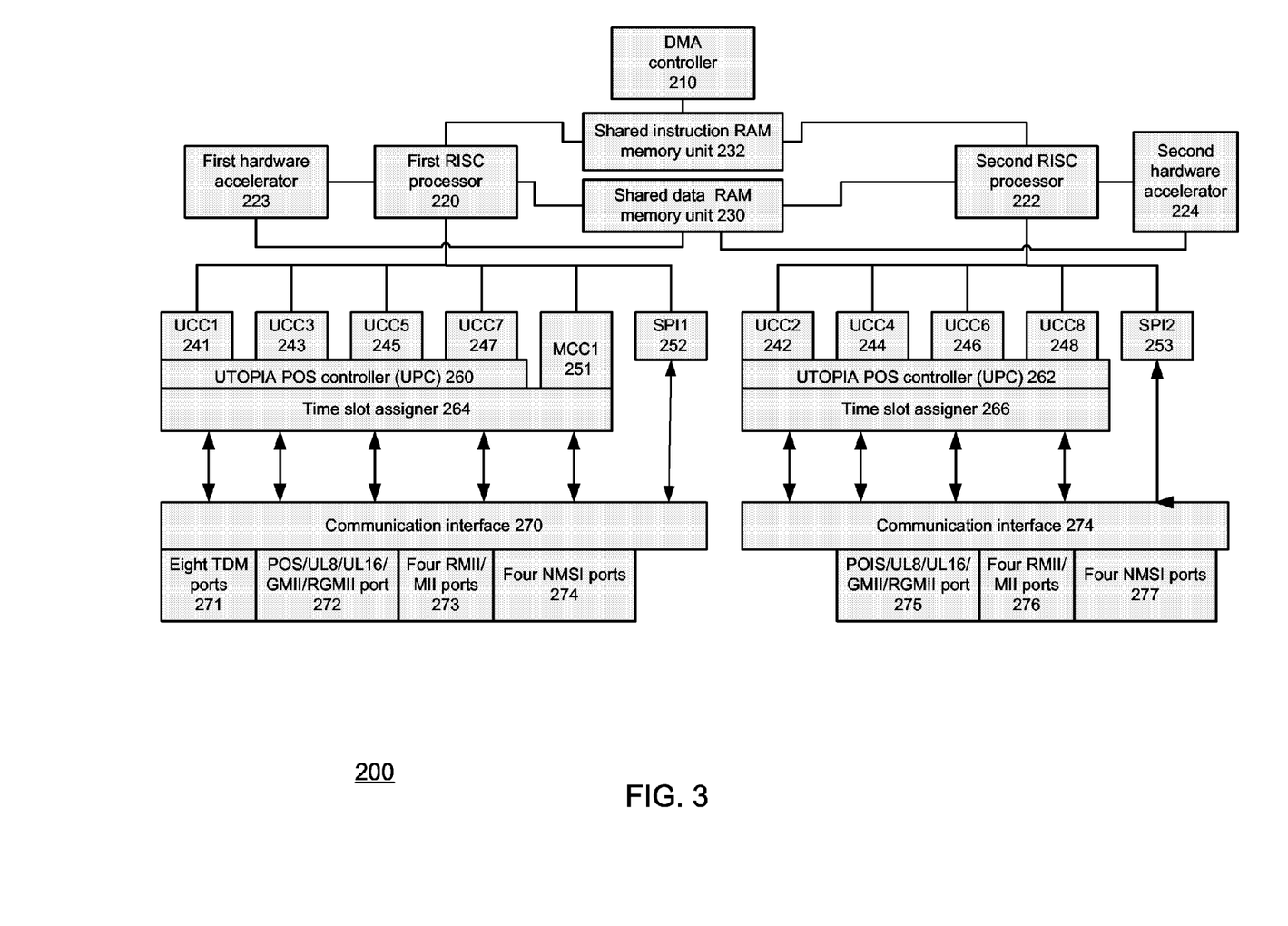
FIG. 3 illustrates a communication engine, according to an embodiment of the invention.

FIG. 3 illustrates a communication engine 200, according to an embodiment of the invention.

It is noted that FIG. 3 illustrates an embodiment of the invention and that other communication engines (including those who have a single processor or more that two processors) can be used.

The communication engine 200 is a versatile communication component that can manage multiple communication ports that operate according to different communication protocols. It includes two RISC processors 220 and 222 that can work substantially independently from each other.

The communication engine 200 includes two RISC processors 220 and 222, two DMA controllers 210, a shared data RAM memory unit 230, a shared instruction RAM memory unit 232, eight universal communication controllers denoted UCC1-UCC8 241-248, one multi-channel communication controller (MCC) 251, two serial peripheral interfaces denoted SP1-SP2 252-253, two UTOPIA POS controllers 261 and 262, two time slot assigners 264 and 266 and two communication interfaces 270 and 274. Time slot assigner 264 assigns time slots for accessing communication interface 270. Time slot assigner 266 assigns time slots for accessing communication interface 274.

The first communication interface 270 is connected to multiple time division multiplex (TDM) ports that are collectively denoted 271, a UTOPIA-packet over SONET (POS) port 272, as well as four RMII ports collectively denoted 273, and four NMSI ports collectively denoted 274.

The second communication interface 274 is connected to another UTOPIA-packet over SONET (POS) port 275, four RMII ports collectively denoted 276, and four NMSI ports collectively denoted 274. It is noted that other communication protocols can be supported by communication device 10.

Each RISC processor out of 220 and 222 can access the shared data RAM memory unit 230 and the shared instruction RAM memory unit 232. RISC processor 220 can control half of the multiple communication controllers and ports. For example, RISC processor 220 can control UCC1-UCC4 241-244, MCC 251 and SPIL 252. It can also communicate with UTPOIA POS controller 260 and time slot assigner 264.

Conveniently, a UCC can support the following communication protocols and interfaces (not all simultaneously): 10/100 Mbps Ethernet, 1000 Mpbs Ethernet, IPv4 and IPv6, L2 Ethernet switching using, ATM protocol via UTOPIA interface, various types of HDLC, UART, and BISYNC.

Conveniently, MCC 251 supports two hundred and fifty six HDLC or transparent channels, one hundred and twenty eight SS#7 channels or multiple channels that can be multiplexed to one or more TDM interfaces.

In addition, the communication engine 200 can include a controller (not shown) as well as an interrupt unit that coordinate the various components of the communication engine, as well as to enable the communication engine 200 to communicate with general-purpose processor 110, security engine 62 and system interface unit 140.

The first RISC processor 220 is connected to a first hardware accelerator 223. The first hardware accelerator 223 can access the shared data RAM memory unit 230. The second RISC processor 222 is connected to a second hardware accelerator 224. The second hardware accelerator 224 can access the shared data RAM memory unit 230. Each accelerator can include a search unit. This search unit searches for matches between the VCI and VPI fields of a received ATM cell and the VCI and VPI fields stored in a VCI/VPI table 500.

Figure 4:
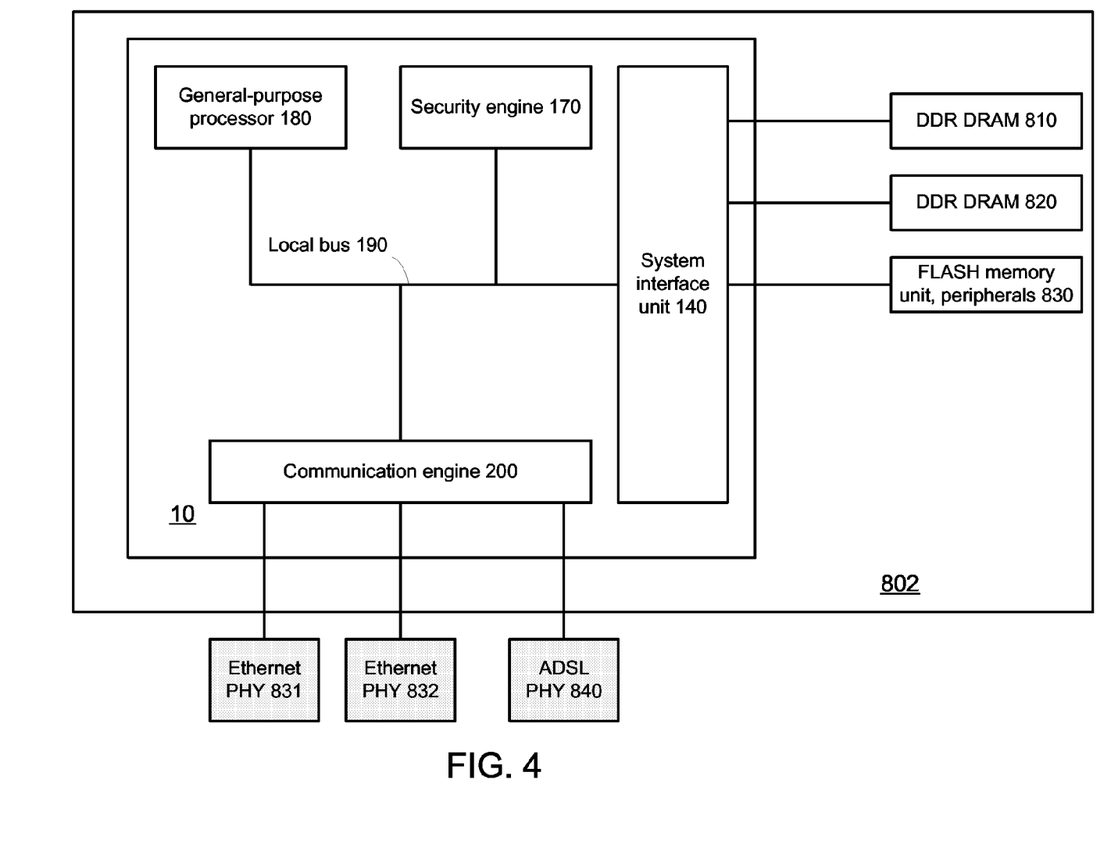
FIG. 4 illustrates an exemplary configuration of the communication device, and its environment, according to an embodiment of the invention.

FIG. 4 illustrates an exemplary configuration of communication device 10, and its environment, according to an embodiment of the invention.

Communication device 10 is illustrated as supporting a data path of a DSL line card 802. The DSL line card 802 is a part of access network 101 of FIG. 1.

Line card 802 also includes two DDR DRAM units 810 and 820, as well as a flash memory unit 830, all being connected to communication device 10 via the system interface unit 140.

The communication engine 200 is configured as an xDSL line card and is connected to multiple Ethernet PHY units 831 and 832, as well as to multiple ADSL PHY units 840. The communication device 10 supports ATM multi-PHY subscriber lines and an Ethernet uplink.

Figure 5:
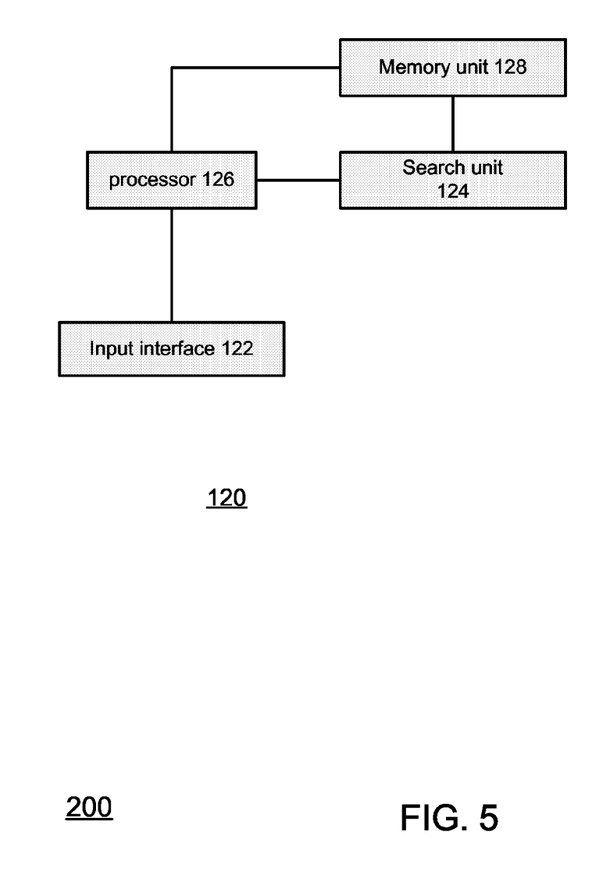
FIG. 5 illustrates a portion of the communication device, according to an embodiment of the invention.

FIG. 5 illustrates a portion 120 of communication engine 200 according to an embodiment of the invention.

Portion 120 includes input interface 122, search unit 124, processor 126 and memory unit 128. These components can be connected in various manners. Processor 126 can be either one of first RISC processor 220 and second RISC processor 222. Search unit 124 can be a portion of first or second hardware accelerators 223 and 224. The memory unit 128 can be the shared data RAM memory unit 230. The input interface 122 can include one or more of the various components of communication engine 200, such as one of the UCCs 241-248, or MCC 215, but this is not necessarily so.

Conveniently, the processor 126 is connected to input interface 122, search unit 124 and memory unit 128 and is capable of coordinating between these various components.

Input interface 122 is adapted to receive ATM cells. It can include PHY layer components, MAC layer components and higher layer network components. The higher layer network components are used to retrieve the VCI field and the VPI field of the received ATM cell. They are also adapted to assign PHY values with received ATM cells. Input interface 122 can include local memory units, buffer management components, CRC components and the like.

According to an embodiment of the invention the search unit 124 is a part of a hardware accelerator. According to other embodiments of the invention the search can be executed by processor 126, or by components other that the search unit 124. It is noted that having a dedicated hardware search unit can speed the searching process. It is also noted that search unit 124 can have additional capabilities such as minimum and maximum determination, CRC capabilities and the like.

Search unit 124 can access a group of memory entries of memory unit 128 and search for a match between the VCI and VPI fields of the receive ATM cell and the VCI/VPI fields stored in a selected group of memory entries. The selected group of memory entries is also referred to as VCI/VPI table 500. The comparators compare between the VCI and VPI fields of the receive ATM cell and the values of VCI and VPI fields stored in the selected VCI/VPI table 500.

The search unit 124 can be implemented in various manners known in the art. A hardware search unit can include a processor, an arithmetic logic unit, or dedicated logic. Dedicated logic usually includes one or more comparators as well as one or more counters. The amount of comparators and their length can determine the speed of the searching (matching) process, as multiple parallel comparisons can speed the matching process. The search unit 124 conveniently receives a base address of the VCI/VPI table 500 and its length. It outputs a search result that can indicate that the searching failed or, if successful, indicate which entry stored the matching VCI/VPI pair. It is noted that the search unit 124 can include a mask that can allow it to mask (ignore from) portions of the VPI fields or even ignore the whole VPI field.

Processor 126 is adapted to: (i) receive an indication that an ATM cell such as ATM cell 20 was received, (ii) use at least one header field of the received ATM cell 20 or a value associated with the ATM cell to select a parameter table such as parameter table 300 of FIG. 4, (iii) access PHY table 400 of FIG. 4, (iv) process the content of a selected entry of PHY table 400 to determine whether to perform ATM cell processing by the search unit 124, (v) initiate a VCI/VPI table search by the search unit 124, (vi) receive the search result and accordingly determining, if the search succeeded, the location of the channel identifier associated with the ATM cell and optionally also determine the location of the policy identifier associated with ATM cell 20.

It is noted that ATM cell 20 can be further processed by communication device 10 in view of the channel parameters associated with the channel identifier. The ATM cell 20 can also be processed according to a policy associated with the ATM cell 20.

According to an embodiment of the invention the processor 126 can select the group of memory entries (VCI/VPI table 500) out of multiple groups of memory entries in response to the PHY value associated with the received ATM cell. Especially, the PHY value associated with the received ATM cell is used to retrieve an entry from PHY table 500 and the content of that entry is used as an index to a certain VCI/VPI table. It is noted the one or more VCI/VPI tables can exists and that is only one VCI/VPI table exists 500 there is no need to select between different VCI/VPI tables.

According to an embodiment of the invention if a VCI/VPI search failed the processor 35 can request the hardware search unit to mask the VPI field and look for a match between the value of the VCI field of the received ATM cell and the values of VCI fields within a selected VCI/VPI table.

Figure 6:
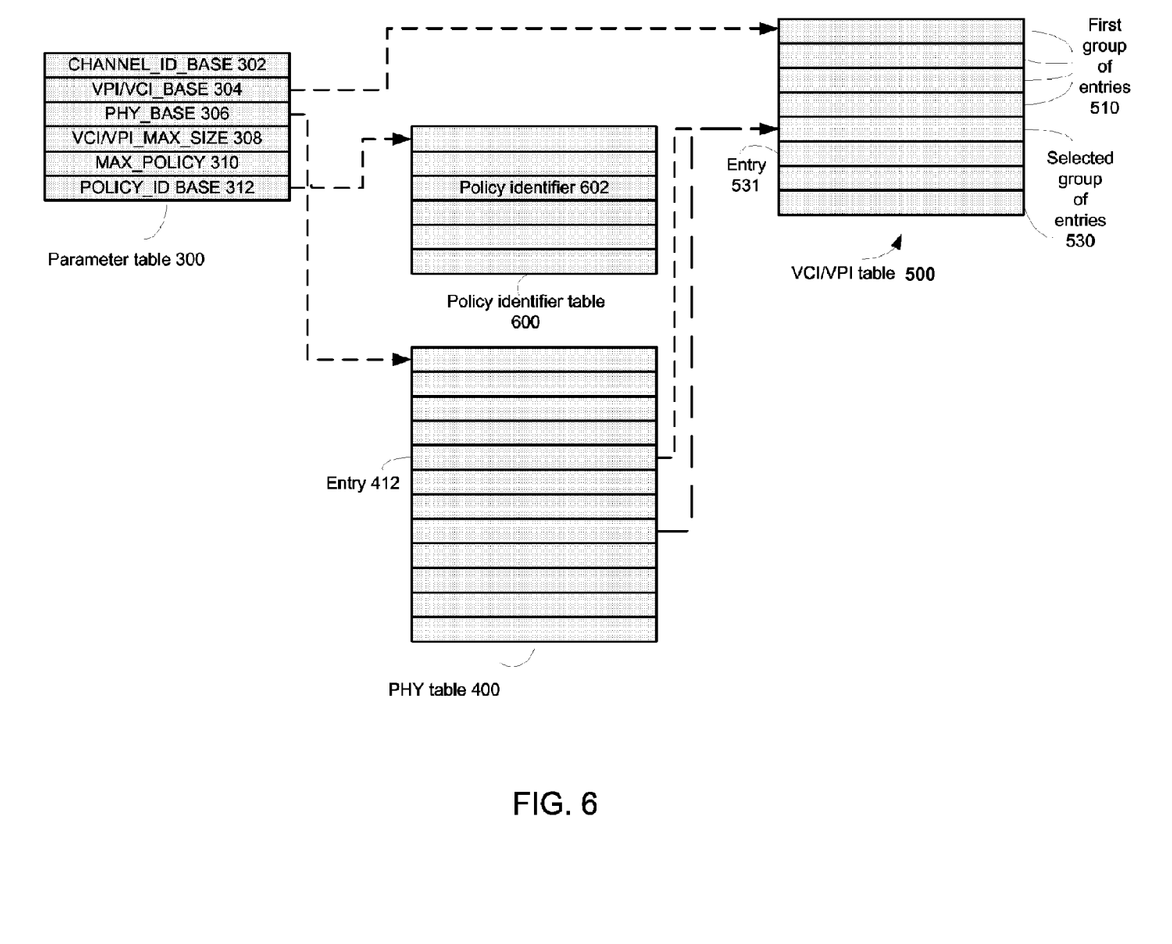
FIG. 6 illustrates exemplary data structures, according to an embodiment of the invention.

FIG. 6 illustrates exemplary data structures 300, 400, 500 and 600, according to an embodiment of the invention.

Parameter table 300 points to various data structures including VPI/VCI table 500, PHY table 400 and policy identifier table 600. It is noted that all these data structures can be stored in one or more memory units. Conveniently, they are stored at the same memory unit (such as shared data RAM memory unit 320) and the memory unit can be accessed by a processor (such as RISC processors 220 and 221) and by a search unit (such as search unit 124 that is a part of first or second hardware accelerators 223 and 224).

Simplified address calculations are enables by storing entries that are related to different channels and/or to different combinations of PHY fields in a linear manner. Thus, an address of an entry within certain tables can be calculated by adding the base address of the table to an index. This is not necessarily so.

Conveniently, each group of PHYs (for example each UCC) shares a single parameter table 300. Parameter table 300 includes the following fields: base address of channel identifiers list field ("CHANNEL_ID_BASE") 302, base address of stored VCI/VPI table ("VCI/VPI_BASE") 304, base address of PHY table ("PHY_BASE") 306, maximal size of group of entries within the VPI/VCI tables ("VCI/VPI_MAX_SIZE") 308, maximal number of different policy identifiers per channel ("MAX_POLICY") 310, and base address of policy identifiers list field ("POLICY_ID_BASE") 312.

The linear manner in which data is stored can be illustrated by the following two examples.

Assuming, for example, that (i) a channel identifier table is sorted in a linear manner, and especially that the channel identifier table is sorted according to the PHY value of ATM cells, and that for a certain PHY value the entries are sorted in the same manner as the VCI/VPI table is arranged, (ii) that a maximal number of entries per one PHY value is MAX_ID, (iii) that a match was found between the Q'th entry of VCI/VPI table 500 and the VCI and VPI fields of a received ATM cell, then the address of the channel identifier associated with that received ATM cell ("CHANNEL_ID_ADDRESS") is calculated according to the following equation:

CHANNEL_ID_ADDRESS={CHANNEL_ID_BASE+(PHY value)*(MAX_ID)+Q}.

Yet for another example, the policy identifiers of each physical channel are stored in consecutive entries, while the maximal number of policy identifiers that can be allocated to a channel is defined by MAX_POLICY 310. Thus, the channel identifiers associated with the first channel are stores at an address range that ranges between POLICY_ID_BASE and between (POLICY_ID_BASE+MAX_POLICY).

When an ATM cell is received from a certain group of users the PHY value associated with it is used to select a PHY table entry. Conveniently, the entry is calculated according to the following equation: PHY address entry address equals the sum of the base address of the PHY table plus the product of: (i) the size of each PHY table entry, and (ii) the value of the PHY value associated with the received ATM cell.

Figure 7:
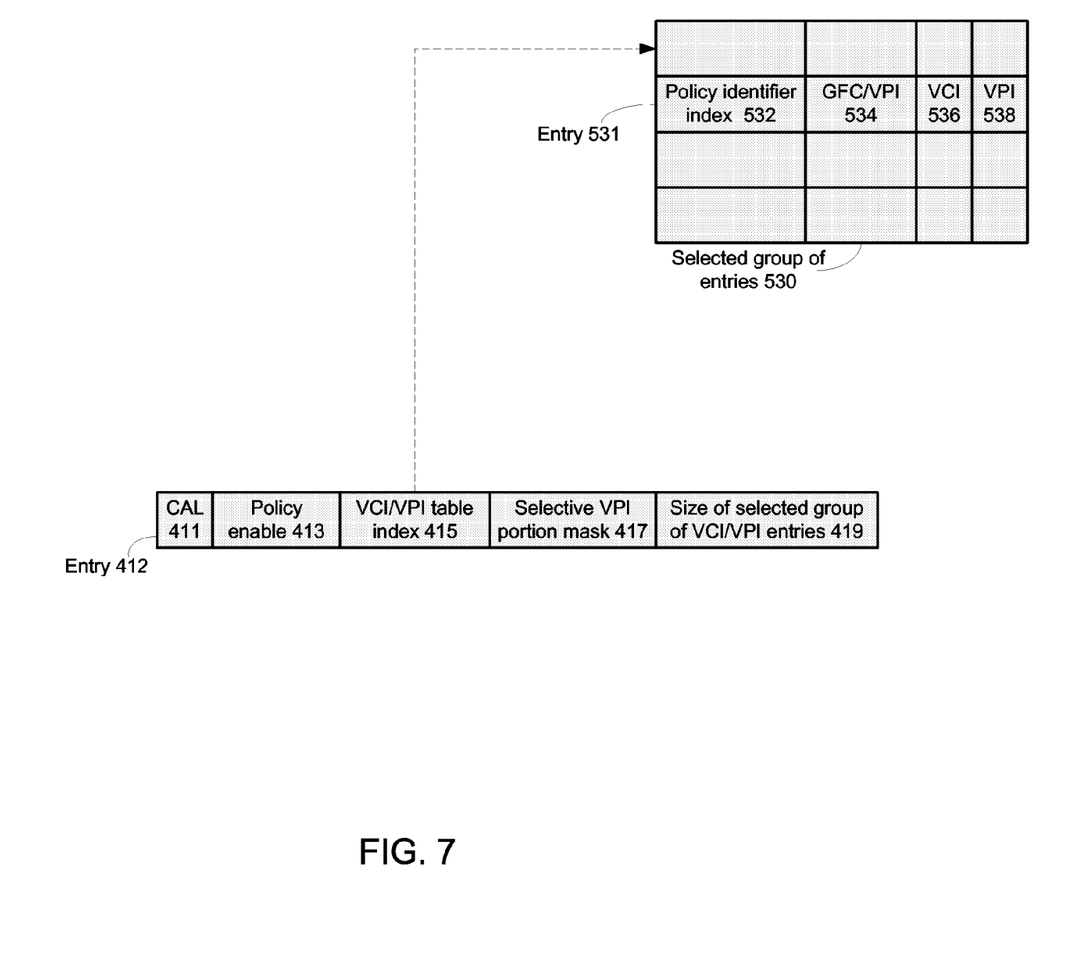
FIG. 7 illustrates exemplary data structures, according to an embodiment of the invention.

It is assumed that the $k^{th}$ entry of the PHY table is selected. This entry is denoted 412 and includes the following fields, as illustrated in FIG. 7: CAL field 411, policy enable field 413, VCI/VPI table index 415, selective VPI portion mask field 417 and size of a selected group of VCI/VPI entries field 419.

The CAL field 411 determines if the received ATM cell should be processed by using the VPI/VCI table 500, or is to be processed according to another mechanism, such as but not limited to a hash mechanism. This field indicates whether the values of the received VCI and VPI fields belongs to a first predefined group of allowed VCI and VPI field values. ATM cells that have VCI and VPI field values that do not belong to that first predefined group are processed in other manners and not by using the VCI/VPI table 500.

The policy enable field 413 indicates whether to apply a traffic policy or not. If a traffic policy is applied the policy identifier should be calculated so that the characteristics of that policy are retrieved using the policy identifier table 600.

The VCI/VPI table index 415 is used to select a group of memory entries that are sent to (or accessed by) a hardware search unit. For example, FIG. 6 illustrates that this index of entry 412 points towards the beginning of a selected group of entries 530 within VCI/VPI table 500. The VCI/VPI table is illustrated as having another group of entries 510. It is noted that the maximal size of each such group is limited by VCI/VPI_MAX_SIZE 308. It is further noted that the VCI/VPI table 500 can include one group of entries, two group of entries or more than two group of entries.

It is noted that the size of the VCI/VPI table 500 can be largely reduced if different PHY values are associated with substantially the same VCI/VPI value. Thus, VCI/VPI table indexes that belong to different PHY table entries can point to the same group of memory entries that form that same VCI/VPI table 500.

The selective VPI portion mask field 417 indicates whether during the search of matching VCI and VPI field values a portion of the VPI field should be masked. This is useful in cases where the VPI field can be either twelve-bit long (and in this case the VPI is not partially masked) or be eight-bit long (and in this case the ninth till twelve bits used for the GFC field and in this case they are masked).

The size of group of VCI/VPI entries field 419 is sent to the hardware search unit and defines the VCI/VPI search limits. The inventors used sizes such as 64, 32 and 16 but other sizes can be used.

Figure 8:
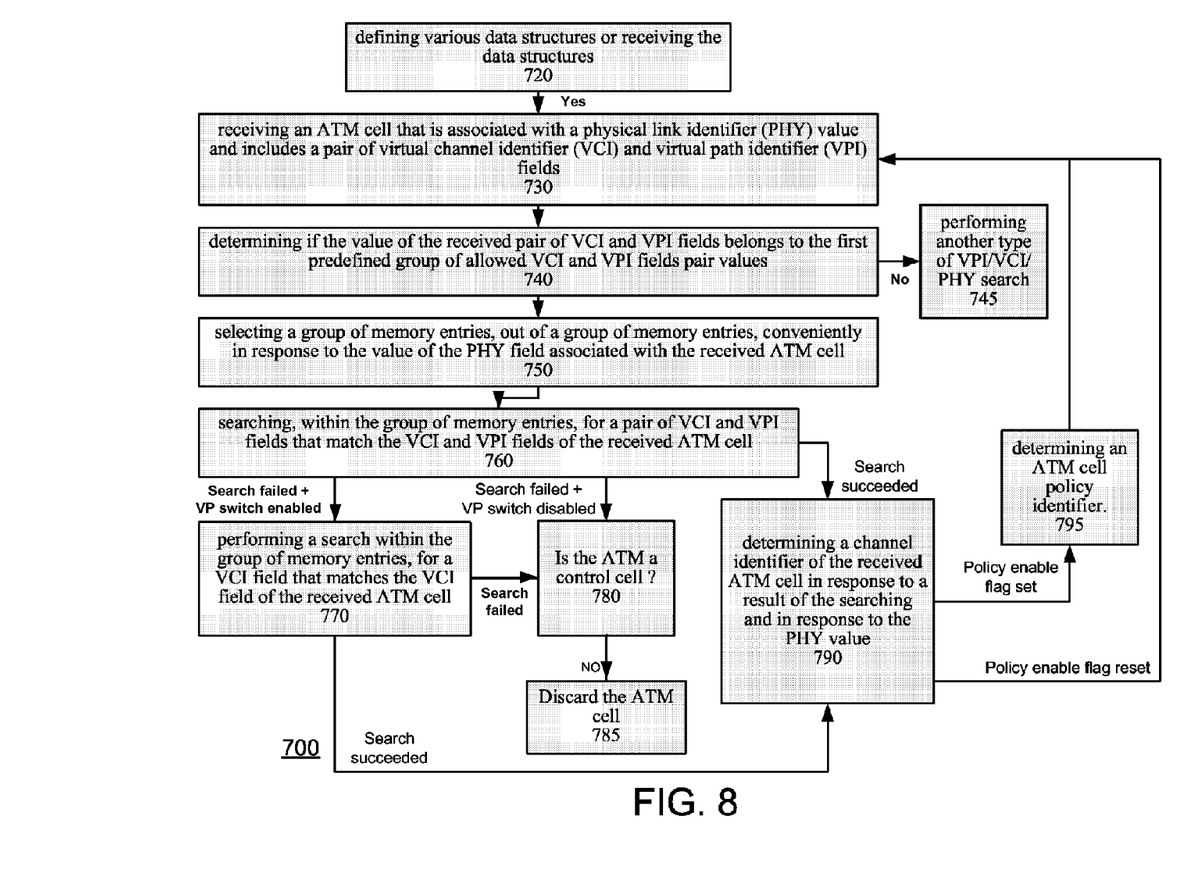
FIG. 8 is a flow chart of a method for processing ATM cells, according to an embodiment of the invention.

Each VCI/VPI table 500 entry includes various fields. For simplicity of explanation one of these entries (entry 531) is illustrated in FIG. 8. Entry 530 includes the following fields—policy identifier index field 532, GFC/VPI field 534, VPI field 536 and VCI field 538.

The policy identifier index field 532 is used to as an index to the policy identifier table 600.

The GFC/VPI field 534 can include a part of the VPI field or include a GFC field.

The values the VCI and VPI fields of the received ATM cell are compared to the values of the VCI and VPI fields of VCI/VPI table 500. If a match is found (the search succeeded) then the channel identifier of the received ATM cell can be determined.

Conveniently, a certain combination of VCI field and VPI field can be located only at one VCI/VPI table and not in other tables.

FIG. 8 is a flow chart of method 700 for processing ATM cells, according to an embodiment of the invention.

Method 700 starts by stage 720 of defining various data structures or receiving these data structures. These data structures usually remain the same during the reception process of many ATM cells. Conveniently, stage 720 includes defining multiple groups of memory entries that store pairs of VCI and VPI field values, whereas different groups of memory entries store different pairs of VCI and VPI values. Thus, a certain combination of VCI field value and VPI field value can be found only in one group of memory entries.

Stage 720 is followed by stage 730 of receiving an ATM cell that includes a physical link identifier (PHY) field and a pair of virtual channel identifier (VCI) and virtual path identifier (VPI) fields. Referring to the example set forth in previous drawings, input interface 122 receives an ATM cell, such as ATM cell 20. In response it notifies processor 126.

Stage 730 is followed by query stage 740 of determining if the values of the received VCI and VPI fields belong to the first predefined group of VCI and VPI fields values. Referring to the example set forth in the previous drawings, processor 126 uses the PHY value associated with ATM cell 20 and selects an entry, such as entry 410 from PHY table 400. The value of CAL 411 field indicates whether to process the ATM cell 20 using VCI/VPI table 500 or to perform another type of ATM processing.

If the answer is positive then query stage 740 is followed by stage 750, else it is followed by stage 745 of performing another type of ATM cell processing. The other type of processing can involve hashing, but this is not necessarily so.

Stage 750 includes selecting a group of memory entries, out of a group of memory entries, conveniently in response to the PHY value associated with the received ATM cell. It is noted that this stage is optional as in cases where VCI/VPI table 500 includes only a single group of entries. In this case there is no need to select between the groups of VCI/VPI table entries. The selection is conveniently defined by the value of the VCI/VPI index fields of the PHY table 400. According to an embodiment of the invention many different VCI/VPI table index fields point to the same group of entries within the VCI/VPI table 500.

Conveniently, stage 750 includes providing to search unit 124, a base address of the selected group of memory entries (such as VCI/VPI_BASE 304), as well as the size of the group of memory entries (such as VCI/VPI_MAX_SIZE 308).

Stage 750 is followed by stage 760 of searching, within the group of memory entries, for a pair of VCI and VPI fields that match the VCI and VPI fields of the received ATM cell.

Conveniently, search unit 124 performs this search by serially (or in a parallel manner) comparing between the various entries of the small group of entries and the value of the pair of VCI and VPI fields of the received ATM cell.

According to an embodiment of the invention stage 760 of searching can involve masking a portion of the VPI field, conveniently according to an ATM cell type indication. The selective masking can be responsive to the value of selective VPI portion mask field 417.

Stage 760 includes providing a search result. The search result can indicate that there is no match (the match process failed) or that the matching process succeeded. In the former case the entry (location) of the stored matching pair of VCI and VPI fields can be provided as the search result.

If the search failed stage 760 can be followed by stage 770 (for example if the a VP switch enable flag is set) of performing a search within the group of memory entries, for a VCI field that matches the VCI field of the received ATM cell.

According to another embodiment of the invention if the search failed and optionally if the additional search of stage 770 failed the method can proceed by determining (stage 780) if the received ATM cell is a control cell (OAM cells), and in such a case the failure of the search does not necessarily cause method 700 to discard (stage 785) the received ATM cell.

If the search succeeds then stage 760 is followed by stage 790 of determining a channel identifier of the received ATM cell in response to a result of the searching process and in response to a PHY value associated with the received ATM cell. Conveniently, stage 790 includes calculating a location of the channel identifier in response to a PHY value associated with the received ATM cell, and in response to location within the group of memory entries, of the pair of VCI field and VPI field that match the VCI and VPI fields of the received ATM cell. Conveniently, the following equation is calculated: CHANNEL_ID_ADDRESS={CHANNEL_ID_BASE+ (PHY value)*(MAX_ID)+Q}.

Stage 790 can be followed by stage 795 of determining an ATM cell policy identifier. Stage 795 can be executed if a policy enable flag is set.

Stage 795 and 790 can be followed by stage 730. Thus, once a new ATM cell is received this ATM cell is processed.

It is noted that once the channel identifier is found the communication device 10 can further process the ATM cell 20.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

The invention claimed is:

1. A method for processing ATM cells, the method comprises:
   receiving at a first input interface a first ATM cell that comprises a first virtual channel identifier (VCI) field and a first virtual path identifier (VPI) field;
   in response to receiving the first ATM cell at the first input interface, selecting a first parameter table, wherein the first parameter table is associated with the first input interface;
   selecting a first PHY table entry from a first PHY table to determine if the first VCI and first VPI fields of the first ATM cell belong to a first predefined group of VCI and VPI fields, wherein selecting the first PHY table entry is based upon a first PHY value from the first ATM cell, wherein the first PHY table is associated with the first parameter table;
   if the first VCI and first VPI fields of the first ATM cell belong to the first predefined group of VCI and VPI fields then:
      performing a first search, by a hardware search unit and within a first group of memory entries of a first VCI/VPI table associated with the first PHY table, for a first pair of VCI and VPI fields that matches the first VCI and first VPI fields of the first ATM cell; and
      determining a first channel identifier of the first ATM cell in response to a result of the first search; and
   processing the first ATM cell without using the first VCI/VPI table if the first VCI and first VPI fields of the first ATM cell do not belong to the first predefined group of VCI and VPI fields.

2. The method according to claim 1, further comprising selecting the first group of memory entries out of multiple groups of memory entries in response to selecting the first PHY table entry.

3. The method according to claim 2, wherein each group of memory entries of the multiple groups of memory entries stores different VCI and VPI field values.

4. The method according to claim 1, wherein processing the first ATM cell comprises applying a hash mechanism.

5. The method according to claim 1, wherein determining the first channel identifier comprises calculating an address of the first channel identifier based upon the first PHY value and on an address of the first pair of VCI and VPI fields that matches the first VCI and first VPI fields of the first ATM cell.

6. The method according to claim 1, wherein performing the first search further comprises selectively masking a portion of the first VPI field.

7. The method according to claim 1, further comprising performing a second search, within the first group of memory entries, for a VCI field that matches the first VCI field of the first ATM cell, in response to a failure of the first search, within the first group of memory entries, for the first pair of VCI and VPI fields that match the first VCI and first VPI fields of the first ATM cell.

8. The method according to claim 1, further comprising determining an ATM cell policy identifier.

9. The method according to claim 1, further comprising determining if values of the first VCI field and first VPI field belong to the first predefined group of VCI and VPI field values based on a content of a field stored in the first PHY table entry.

10. The method according to claim 1, further comprising:
    receiving at a second input interface a second ATM cell that comprises a second VCI field and a second VPI field;
    in response to receiving the second ATM cell at the second input interface, selecting a second parameter table, wherein the second parameter table is associated with the second input interface;
    selecting a second PHY table entry from the PHY table to determine if the second VCI and second VPI fields of the second ATM cell belong to a second predefined group of VCI and VPI fields, wherein selecting the second PHY table entry is based upon a second PHY value from the second ATM cell, wherein the PHY table is associated with the second parameter table;

if the second VCI and second VPI fields of the second ATM cell belong to the second predefined group of VCI and VPI fields then:

performing a second search, by a second hardware search unit and within a second group of memory entries of a VCI/VPI table which may be the first VCI/VPI table or a different VCI/VPI table, for a second pair of VCI and VPI fields that matches the second VCI and second VPI fields of the second ATM cell; and determining a second channel identifier of the second ATM cell in response to a result of the second search; and processing the second ATM cell without using the VCI/VPI table which may be the first VCI/VPI table or a different VCI/VPI table if the second VCI and second VPI fields of the second ATM cell do not belong to the second predefined group of VCI and VPI fields.

11. The method according to claim 1, wherein determining if the first VCI and first VPI fields of the first ATM cell belong to a first predefined group of VCI and VPI fields is based upon a field of the first PHY table entry.

12. A communication device, comprising:

an input interface adapted to receive a first ATM cell that comprises a first virtual channel identifier (VCI) field and first virtual path identifier (VPI) field;

a search unit, adapted to:

select a first parameter table, wherein the first parameter table is associated with the input interface;

select a first PHY table entry from a first PHY table based upon a first PHY value from the first ATM cell, wherein the first PHY table is associated with the first parameter table;

determine if the first VCI and first VPI fields of the first ATM cell belong to a first predefined group of VCI and VPI fields based upon the selecting of the first PHY table entry; and perform a first search, within a first group of memory entries of a first VCI/VPI table that is stored in a memory unit, for a first pair of VCI and VPI fields that has values that match the values of the first VCI and first VPI fields of the first ATM cell, if the first VCI and first VPI fields of the first ATM cell belong to the first predefined group of VCI and VPI fields; and a processor, coupled to the search unit, wherein the processor is adapted to determine a first channel identifier of the first ATM cell in response to a result of the first search;

wherein the communication device is configured to process the first ATM cell without using the first VCI/VPI table if the first VCI and first VPI fields of the first ATM cell do not belong to the first predefined group of VCI and VPI fields.

13. The communication device according to claim 12, wherein the processor is further adapted to select the first group of memory entries out of multiple groups of memory entries in response to selecting the first PHY table entry.

14. The communication device according to claim 13, wherein each group of memory entries of the multiple groups of memory entries stores different VCI and VPI values.

15. The communication device according to claim 12, wherein the processor is further adapted to calculate an address of the first channel identifier based upon the first PHY value and on an address of the first pair of VCI and VPI fields that matches the first VCI and first VPI fields of the first ATM cell.

16. The communication device according to claim 12, wherein the search unit is further adapted to selectively mask a portion of the first VPI field during the first search.

17. The communication device according to claim 12, wherein the search unit is further adapted to search, within the first group of memory entries, for a VCI field that matches the first VCI field of the first ATM cell, in response to a failure of the first search, within the first group of memory entries, for the first pair of VCI and VPI fields that matches the first VCI and first VPI fields of the first ATM cell.

18. The communication device according to claim 12, further adapted to determine an ATM cell policy identifier.

19. The communication device according to claim 12, wherein the communication device is configured to process the first ATM cell by applying a hash mechanism if the first VCI and first VPI fields of the first ATM cell do not belong to the first predefined group of VCI and VPI fields.

20. The communication device according to claim 12, wherein the processor is further adapted to read a field of the first PHY table entry that is indicative of whether to process the first ATM cell using the first VCI/VPI table or perform another type of ATM processing.

21. The communication device according to claim 12, further comprising:

a second input interface adapted to receive a second ATM cell that comprises a second VCI field and a second VPI field;

a second search unit adapted to:

select a second parameter table, wherein the second parameter table is associated with the second input interface;

select a second PHY table entry from the PHY table based upon a second PHY value from the second ATM cell, wherein the PHY table is associated with the second parameter table;

determine if the second VCI and second VPI fields of the second ATM cell belong to a second predefined group of VCI and VPI fields based upon the selecting of the second PHY table entry; and perform a second search, within a second group of memory entries of a VCI/VPI table which may be the first VCI/VPI table or a different VCI/VPI table and that is stored in the memory unit, for a second pair of VCI and VPI fields that has values that match the values of the second VCI and second VPI fields of the second ATM cell, if the second VCI and second VPI fields of the second ATM cell belong to the second predefined group of VCI and VPI fields; and a second processor adapted to determine a second channel identifier of the second ATM cell in response to a result of the second search; and the communication device is configured to process the second ATM cell without using the VCI/VPI table which may be the first VCI/VPI table or a different VCI/VPI table if the second VCI and second VPI fields of the second ATM cell do not belong to the second predefined group of VCI and VPI fields.

22. The communication device according to claim 12, wherein determining if the first VCI and first VPI fields of the first ATM cell belong to a first predefined group of VCI and VPI fields is based upon a field of the first PHY table entry.

* * * * *